United States Patent
Ma et al.

(10) Patent No.: US 9,282,331 B2
(45) Date of Patent: Mar. 8, 2016

(54) IMAGE PROCESSING METHOD AND ELECTRONIC DEVICE

(71) Applicant: LENOVO (BEIJING) LIMITED, Beijing (CN)

(72) Inventors: Lin Ma, Beijing (CN); Qiang Liu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/227,698

(22) Filed: Mar. 27, 2014

(65) Prior Publication Data

US 2015/0043833 A1    Feb. 12, 2015

(30) Foreign Application Priority Data

Aug. 9, 2013   (CN) .......................... 2013 1 0347604

(51) Int. Cl.

| | |
|---|---|
| G06K 9/36 | (2006.01) |
| H04N 19/105 | (2014.01) |
| H04N 19/172 | (2014.01) |
| H04N 19/15 | (2014.01) |
| H04N 19/134 | (2014.01) |
| H04N 19/192 | (2014.01) |
| H04N 19/60 | (2014.01) |

(52) U.S. Cl.
CPC .......... *H04N 19/105* (2014.11); *H04N 19/134* (2014.11); *H04N 19/15* (2014.11); *H04N 19/172* (2014.11); *H04N 19/192* (2014.11); *H04N 19/60* (2014.11)

(58) Field of Classification Search
None
See application file for complete search history.

(56) References Cited

U.S. PATENT DOCUMENTS

| | | | |
|---|---|---|---|
| 2006/0291557 A1* | 12/2006 | Tourapis .................. | 375/240.12 |
| 2010/0039536 A1* | 2/2010 | Dahllof et al. ........... | 348/240.99 |
| 2010/0128930 A1* | 5/2010 | Liu et al. ................. | 382/103 |

* cited by examiner

*Primary Examiner* — Eueng-Nan Yeh
(74) *Attorney, Agent, or Firm* — Kinney & Lange, P.A.

(57) ABSTRACT

The embodiments of the present invention provide an image processing method and an electronic device. The method comprises: obtaining all image characteristics contained in each of N captured images and determining at least one image characteristic from the all image characteristics; searching the N images for at least two images each containing the at least one image characteristic based on the at least one image characteristic; determining a reference image from the at least two images and obtaining image residue information characterizing an image difference parameter between the reference image and each of the at least two images; and applying data compression to the reference image and the image residue information. In this way, it is possible to solve the problem associated with limited image compression scheme and large space occupation by pictures.

20 Claims, 2 Drawing Sheets

IMAGE PROCESSING METHOD AND ELECTRONIC DEVICE

TECHNICAL FIELD

The present invention relates to electronic technology, and more particularly, to an image processing method and an electronic device.

BACKGROUND

With the development of electronic technology, electronic terminals become increasingly widespread. Smart terminals such as mobile phones and tablet computers have become necessary terminal devices. Various applications can be installed in these terminal devices for providing users with various services.

Of course, conventional terminal devices are capable of storing data contents required by users. For example, when a user take or receive pictures, these pictures can be stored in an associated terminal. In order to take full advantage of the terminal device's own storage space, the terminal device will compress the pictures, typically in a JPEG format, and then store the compressed pictures. In this way, the storage requirement on the storage device of the terminal can be reduced.

However, the conventional picture compression scheme is limited and thus cannot reduce the data space occupied by pictures, resulting in large space occupation by the pictures.

SUMMARY

The embodiments of the present invention provide an image processing method and an electronic device, capable of solving the above problem associated with limited image compression scheme and large space occupation by pictures. In particular, the following solutions are provided.

An image processing method is provided. The image processing method comprises: obtaining all image characteristics contained in each of N captured images and determining at least one image characteristic from the all image characteristics; searching the N images for at least two images each containing the at least one image characteristic based on the at least one image characteristic; determining a reference image from the at least two images and obtaining image residue information characterizing an image difference parameter between the reference image and each of the at least two images; and applying data compression to the reference image and the image residue information to obtain a data compressed image data package having a data volume smaller than a data volume that would be obtained if the at least two images were compressed directly.

Optionally, the image characteristic comprises time information and/or geographical location information for obtaining the image.

Optionally, said determining a reference image from the at least two images comprises: determining image residue information between each of the at least two images and the other image(s) of the at least two images; and determining from the image residue information an image corresponding to the image residue information having the smallest data volume as the reference image.

Optionally, the method further comprises, subsequent to said applying data compression to the reference image and the image residue information to obtain a data compressed image data package: judging, upon detecting a deletion operation for deleting a first image of the at least two images, whether the first image is the reference image; and applying, when the first image is the reference image, predetermined image processing to the image(s) other than the reference image to obtain an image set of predetermined image processed image(s).

Optionally, said applying predetermined image processing to the image(s) other than the reference image to obtain an image set of predetermined image processed image(s) comprises: restoring all of the at least two images based on the reference image and the image residue information when the first image is the reference image; determining a second image from all of the at least two images as a new reference image; and obtaining image residue information between each of the other image(s) of the at least two images and the new reference image based on the new reference image and compressing and storing the image set containing the new reference image and the image residue information.

Optionally, said applying predetermined image processing to the image(s) other than the reference image to obtain an image set of predetermined image processed image(s) comprises: obtaining image residue information between the reference image and a second image of the at least two images when the first image is the reference image; determining an image generated based on the second image and the image residue information as a new reference image; and obtaining image residue information between each of the other image(s) of the at least two images and the new reference image based on the new reference image and compressing and storing the image set containing the new reference image and the image residue information.

Optionally, the method further comprises, subsequent to said applying data compression to the reference image and the image residue information to obtain a data compressed image data package: judging, upon detecting a deletion operation for deleting a first image of the at least two images, whether the first image is the reference image; and moving, when the first image is the reference image, the reference image from its current first storage position to a second storage position where the reference image can be used for restoring each of the at least two images.

Optionally, the method further comprises, subsequent to said moving the reference image from its current first storage position to a second storage position: detecting whether the reference image has its corresponding image residue information; and deleting the reference image from the second storage position when the reference image has no corresponding image residue information.

Optionally, the method further comprises, after the data compressed image data package is obtained: decompressing, upon receiving one of the at least two images that is to be displayed, the reference image and the image residue information corresponding to the one image from the compressed data package; and adding the image residue information to the reference image and generating and displaying the image.

An image processing method is provided. The method comprises: obtaining all image characteristics in a captured image and judging whether the image characteristics match predetermined image characteristics; retrieving, when the image characteristics match the predetermined image characteristics, a predetermined reference image containing the predetermined image characteristics and obtaining image residue information between the image and the reference image based on the predetermined reference image; and compressing and storing the image residue information.

Optionally, the method further comprises, subsequent to said compressing and storing the image residue information: retrieving the predetermined reference image and the image residue information when retrieving the image for displaying; and adding the image residue information to the predetermined reference image to obtain and display the image.

An electronic device is provided. The electronic device comprises: an obtaining module configured to obtain all image characteristics contained in each of N captured images and determine at least one image characteristic from the all image characteristics; a searching module configured to search the N images for at least two images each containing the at least one image characteristic based on the at least one image characteristic; a determining module configured to determine a reference image from the at least two images and obtain image residue information characterizing an image difference parameter between the reference image and each of the at least two images; and a processing module configured to apply data compression to the reference image and the image residue information to obtain a data compressed image data package having a data volume smaller than a data volume that would be obtained if the at least two images were compressed directly.

Optionally, the determining module is further configured to determine image residue information between each of the at least two images and the other image(s) of the at least two images and determine from the image residue information an image corresponding to the image residue information having the smallest data volume as the reference image.

Optionally, the determining module is further configured to judge, upon detecting a deletion operation for deleting a first image of the at least two images, whether the first image is the reference image, and the processing module is further configured to apply, when the first image is the reference image, predetermined image processing to the image(s) other than the reference image to obtain an image set of predetermined image processed image(s).

An electronic device is provided. The electronic device comprises: a judging module configured to obtain all image characteristics in a captured image and judge whether the image characteristics match predetermined image characteristics; an obtaining module configured to retrieve, when the image characteristics match the predetermined image characteristics, a predetermined reference image containing the predetermined image characteristics and obtain image residue information between the image and the reference image based on the predetermined reference image; and a processing module configured to compress and store the image residue information.

In the embodiment of the present invention, during the process where the terminal performs the image processing, the terminal obtains all image characteristics contained in each of N captured images, determines at least one image characteristic from the all image characteristics, and searches the N images for at least two images each containing the at least one image characteristic based on the at least one image characteristic. Then the terminal determines a reference image from the at least two images and obtains image residue information characterizing an image difference parameter between the reference image and each of the at least two images. Finally, the terminal applies data compression to the reference image and the image residue information. In this way, it is possible to solve the problem associated with limited image compression scheme and large space occupation by pictures. On the basis of the reference image, only the image residue information between the reference image and each of the other images needs to be stored, thereby reducing the storage space of the terminal that is occupied by the images and reducing the storage requirement on the terminal.

In the embodiment of the present invention, the terminal parses each of N obtained images, obtains N characteristics in each image and divides them into M characteristic sets. The terminal determines at least one image corresponding to each of the M characteristic sets as a first image set and obtains K first image sets. The terminal applies image compression to each of the K first image sets to generate K second image sets. In this way, the images can be compressed by category and the compression processing can be performed based on one criterion, thereby reducing the data volume of the compressed images and reducing the storage space occupied by the images.

DETAILED DESCRIPTION OF THE EMBODIMENTS

The solutions of the present invention will be described in detail with reference to the figures and embodiments. It is to be noted that the embodiments of the present invention and the specific technical features thereof are only provided for the purpose of explaining the solutions of the present invention, rather than limiting the scope of the present invention.

First Embodiment

Figure 1:
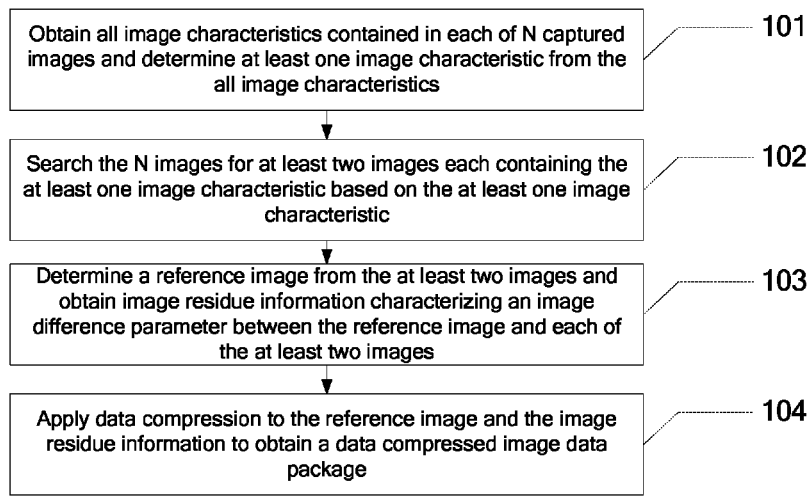
FIG. 1 is a flowchart illustrating an image processing method according to an embodiment of the present invention.

FIG. 1 is a flowchart illustrating an image processing method according to an embodiment of the present invention. The method includes the following steps.

At step 101, all image characteristics contained in each of N captured images are obtained and at least one image characteristic is determined from the all image characteristics.

It is to be noted here that the N images can be images received from another terminal or images captured by the terminal using its own image capturing unit. After the N images are obtained, they will be analyzed first to determine the image characteristics corresponding to each of the N images. In particular, these image characteristics can be time information and/or geographical location information for obtaining the image.

It is to be noted here that N can be 1. That is, once the first image is obtained, it can be analyzed.

Then, the terminal will determine at least one image characteristic from the all image characteristics. This image characteristic can be any one of the image characteristics, such as time and location, or any combination thereof.

After determining the at least one image characteristic, the terminal will proceed with step 102.

At step 102, the N images are searched for at least two images each containing the at least one image characteristic based on the at least one image characteristic.

In the step 101, the terminal has determined at least one image characteristic from the all image characteristics. The terminal first searches the N images for images each containing the determined image characteristic based on the determined image characteristic. For example, when the determined image characteristic is time information for obtaining the image, e.g., Jan. 1, 2013, the terminal will search the N images for all images generated on the time of Jan. 1, 2013. Those images as found will be grouped into a set.

Of course, the image characteristic can alternatively be geographical location information. For example, when the determined image characteristic is "Beijing", the terminal will convert this specific geographical location name into specific longitude and latitude information. Then the terminal will search all of the N images for images within the longitude and latitude range and group those images as found into a set.

After those images are found, the terminal will proceed with step 103.

At step 103, a reference image is determined from the at least two images and image residue information characterizing an image difference parameter between the reference image and each of the at least two images is obtained.

After obtaining the at least two images from the N images in the step 102, the terminal determines image residue information between each of the at least two images and the other image(s) of the at least two images. Here the image residue information characterizes a difference between images with respect to pixel areas or pixels. Then, the terminal determines a data volume of each piece of image residue information and compares all the determined data volumes, so as to determine the image residue information having the smallest data volume. Finally, the image corresponding to the image residue information is determined as the reference image.

For example, four images, namely Image A, Image B, Image C and Image D, are determined based on the image characteristic. In this case, the terminal first determines first image residue information between Image A and each of Image B, Image C and Image D, then determines second image residue information between Image B and each of Image A, Image C and Image D, and finally third image residue information and fourth image residue information sequentially.

After determining the first, second, third and fourth image residue information, the terminal determines a first data volume corresponding to the first image residue information, a second data volume corresponding to the second image residue information, a third data volume corresponding to the third image residue information and a fourth data volume corresponding to the fourth image residue information. Then the terminal compares the first, second, third and fourth data volumes. When determining that the first data volume is the smallest data volume, the terminal determines Image A corresponding to the first data volume as the reference image.

Once the reference image is determined, the terminal device can determine the image residue information between the reference image and each of the other images accurately.

In particular, after determining the reference image, the terminal will compare each of the determined images with the reference image, i.e., determine parameter differences between pixels at the same position in the reference image and each of the other images and obtain the image residue information from the parameter differences. That is, the image residue information will be obtained for the reference image and each of the other images and will be stored by the terminal.

For example, when Image A is determined as the reference image, the image residue information between Image A and Image B is the first image residue information, the image residue information between Image A and Image C is the second image residue information and the image residue information between Image A and Image D is the third image residue information. The image residue information and the image corresponding to the image residue information will be stored by the terminal.

After obtaining the reference image and the image residue information, the terminal will proceed with step 104.

At step 104, data compression is applied to the reference image and the image residue information to obtain a data compressed image data package.

In the step 103, the terminal has determined the reference image as well as the image residue information between the reference image and each of the other images. In order to further reduce the storage space occupied by all of the determined images, the terminal first applies JPEG image compression to the reference image for reducing the data volume of the reference image first, and then applies the same compression to the image residue information for further reducing the data volume occupied by all of the determined images. Finally, the terminal stores the compressed reference image and the image residue information.

In the above embodiment, during the process where the terminal performs the image processing, the terminal obtains all image characteristics contained in each of N captured images, determines at least one image characteristic from the all image characteristics, and searches the N images for at least two images each containing the at least one image characteristic based on the at least one image characteristic. Then the terminal determines a reference image from the at least two images and obtains image residue information characterizing an image difference parameter between the reference image and each of the at least two images. Finally, the terminal applies data compression to the reference image and the image residue information. In this way, it is possible to solve the problem associated with limited image compression scheme and large space occupation by pictures. On the basis of the reference image, only the image residue information between the reference image and each of the other images needs to be stored, thereby reducing the storage space of the terminal that is occupied by the images and reducing the storage requirement on the terminal.

Moreover, the above embodiment will be further explained in connection with a particular application scenario.

For example, a user can use his/her mobile phone to take a picture. When the user takes a number of pictures successively in a scene, these successively taken pictures have several image characteristics in common, such as time and location. In this case, the mobile phone can group these successively taken pictures into a set and determine a reference image from the set of pictures. Then, the mobile phone determines the image residue information between the reference image and each of the other images. Finally, the mobile phone stores only the reference image and all the image residue information corresponding to the reference image.

As another example, when a user uses his/her mobile phone to upload pictures to a cloud server, the mobile phone first categorizes the images to be uploaded based on image characteristics. Then, a reference image is determined for each category of images and the image residue information between the reference image and each of the other images can be determined according to the first embodiment. At this time, the mobile phone can compress the reference image and the image residue information. Finally, a data package containing the reference image and the image residue information can be obtained. In this case, the mobile phone will transmit the data package to the cloud server for storing. Since only the compressed reference image and the compressed image residue information are stored in the data package, the data volume of the data packet is much smaller than it would be if the images were compressed directly. In this way, both the user's cost on the data volume and the requirement on the data link can be reduced.

Further, after the images are stored according to the above embodiment, when receiving an operation for displaying one of the at least two stored images, the terminal first decompresses the reference image and the image residue information corresponding to the one image to be displayed from the compressed data package. Then the terminal adds the image residue information to the reference image to finally generate the image to be displayed. In fact, this process involves processing the reference image based on the image residue information and obtaining the image to be finally displayed based directly on the reference image. In this way, it is ensured that the user can obtain the image he/she needs accurately.

Further, when the user wants to delete a first image stored in the terminal, the terminal first judges whether the first image is the reference image. When the first image is the reference image, the terminal applies predetermined image processing to the images other than the reference image to obtain an image set of predetermined image processed images. Here the predetermined image processing includes the following schemes.

Scheme I

First, the terminal will not delete the reference image directly. Instead, it restores all of the at least two images based on the reference image and the image residue information corresponding to the reference image. Then, a second image is determined from all of the at least two images as a new reference image. Finally, image residue information between each of the other image(s) of the at least two images and the new reference image is obtained based on the new reference image and the image set containing the new reference image and the image residue information is compressed and stored.

For example, the original image set contains Image A and the image residue information for each of Image B, Image C and Image D. The original reference image is Image A and the user wants to delete the reference image A. In this case, the terminal first restores Image B, Image C and Image D based on Image A and then determines, from the restored images, Image B as a new reference image. At this time the terminal determines the residue information between Image B and each of Image C and Image D. Finally, the terminal stores Image B and the residue information corresponding to Image B.

Scheme II

When the first image to be deleted by the user is the reference image, the terminal obtains image residue information between the reference image and a second image of the at least two images and determines an image generated based on the second image and the image residue information as a new reference image. Finally, the terminal obtains image residue information between each of the other image(s) of the at least two images and the new reference image based on the new reference image and compresses and stores the image set containing the new reference image and the image residue information For example, the original image set contains Image A and the image residue information for each of Image B, Image C and Image D. The original reference image is Image A and the user wants to delete the reference image A. In this case, the terminal first restores Image B based on Image A and determines the image residue information between Image A and Image B, with the residue information corresponding to each of Image C and Image D remaining as it is. Finally, the terminal stores Image B and the residue between Image B and Image A, as well as the image residue information between Image C and Image A and the image residue information between Image D and Image A.

With either of the above two schemes, it can be ensured that, when the reference image is deleted, a new reference image can be determined from the other images and the images can be stored and restored based on the determined new reference image. In this way, it is convenient for the user to edit and view the images while the space occupied by the images is minimized.

Further, in an embodiment of the present invention, when the user wants to delete the reference image, the terminal will move the reference image from its current first storage position to a second, different storage position where the reference image can be used for restoring each of the other images but cannot be viewed.

When all the image residue information corresponding to the reference image has been completely deleted by the user, the reference image at the second storage position will be deleted eventually. In this way, it is ensured that, even if the user deletes the reference image accidentally, the original image can be restored, which improves the usability of image storage.

Second Embodiment

Figure 2:
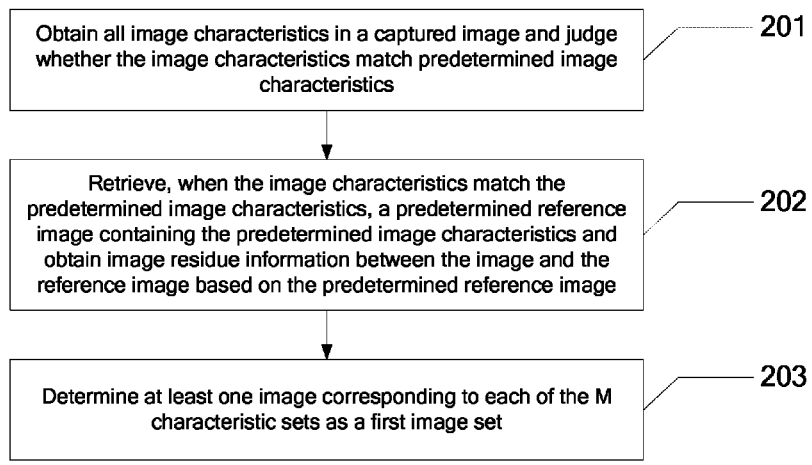
FIG. 2 is a flowchart illustrating an image processing method according to an embodiment of the present invention.

According to this embodiment, an image processing method is also provided. FIG. 2 is a flowchart illustrating the image processing method according to this embodiment. The method includes the following steps.

At step 201, all image characteristics in a captured image are obtained and it is judged whether the image characteristics match predetermined image characteristics.

At step 202, when the image characteristics match the predetermined image characteristics, a predetermined reference image containing the predetermined image characteristics is retrieved and image residue information between the image and the reference image is obtained based on the predetermined reference image.

At step 203, the image residue information is compressed and stored.

In this embodiment, after obtaining an image, the terminal device first parses the captured image to obtain the image characteristics in the image and then matches the obtained image characteristics with the predetermined image characteristics. Of course the predetermined image characteristics here may include time and location characteristics and the predetermined image characteristics are image characteristics contained in the reference image. Thus, when the image characteristics of the obtain image are the predetermined image characteristics, the terminal retrieves a pre-stored reference image and then obtains the image residue information between the reference image and the captured image based on the reference image. Finally, the terminal directly compresses and stores the image residue information.

When there is an operation on the terminal for retrieving the image for displaying, the terminal first retrieves the predetermined reference image and the image residue information and then adds the image residue information to the predetermined reference image to finally generate the image to be displayed and display it.

Third Embodiment

This embodiment provides an electronic device corresponding to the first embodiment.

Figure 3:
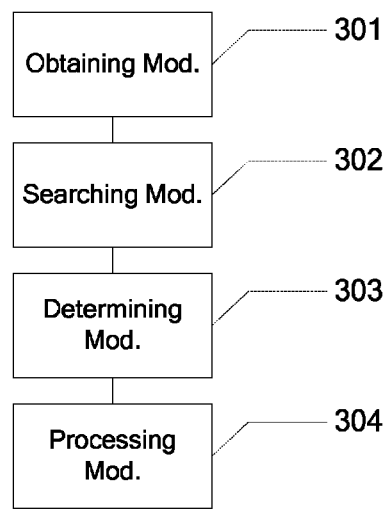
FIG. 3 is a schematic diagram showing a structure of an electronic device according to an embodiment of the present invention.

FIG. 3 is a schematic diagram showing the structure of the electronic device according to this embodiment. The electronic device includes:

an obtaining module 301 configured to obtain all image characteristics contained in each of N captured images and determine at least one image characteristic from the all image characteristics;

a searching module 302 configured to search the N images for at least two images each containing the at least one image characteristic based on the at least one image characteristic;

a determining module 303 configured to determine a reference image from the at least two images and obtain image residue information characterizing an image difference parameter between the reference image and each of the at least two images; and a processing module 304 configured to apply data compression to the reference image and the image residue information to obtain a data compressed image data package having a data volume smaller than a data volume that would be obtained if the at least two images were compressed directly.

The determining module 303 is further configured to determine image residue information between each of the at least two images and the other image(s) of the at least two images and determine from the image residue information an image corresponding to the image residue information having the smallest data volume as the reference image.

The determining module 303 is further configured to determine parameter differences between pixels at the same position in the reference image and each of the other images and determine the parameter differences as the image residue information.

The determining module 303 is further configured to judge, upon detecting a deletion operation for deleting a first image of the at least two images, whether the first image is the reference image.

The processing module 304 is further configured to apply, when the first image is the reference image, predetermined image processing to the image(s) other than the reference image to obtain an image set of predetermined image processed image(s).

Fourth Embodiment

Figure 4:
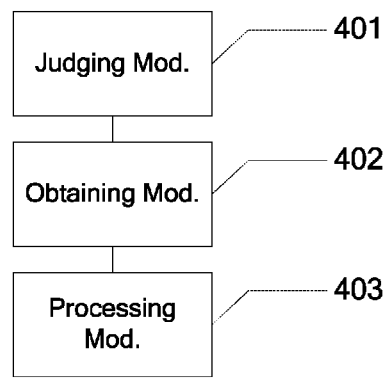
FIG. 4 is a schematic diagram showing a structure of an electronic device according to an embodiment of the present invention.

This embodiment provides an electronic device corresponding to the second embodiment. FIG. 4 is a schematic diagram showing the structure of the electronic device according to this embodiment. The electronic device includes:

a judging module 401 configured to obtain all image characteristics in a captured image and judge whether the image characteristics match predetermined image characteristics;

an obtaining module 402 configured to retrieve, when the image characteristics match the predetermined image characteristics, a predetermined reference image containing the predetermined image characteristics and obtain image residue information between the image and the reference image based on the predetermined reference image; and a processing module 403 configured to compress and store the image residue information.

One or more embodiments according to the present invention have at least the following technical effects or advantages.

In the embodiment of the present invention, during the process where the terminal performs the image processing, the terminal obtains all image characteristics contained in each of N captured images, determines at least one image characteristic from the all image characteristics, and searches the N images for at least two images each containing the at least one image characteristic based on the at least one image characteristic. Then the terminal determines a reference image from the at least two images and obtains image residue information characterizing an image difference parameter between the reference image and each of the at least two images. Finally, the terminal applies data compression to the reference image and the image residue information. In this way, it is possible to solve the problem associated with limited image compression scheme and large space occupation by pictures. On the basis of the reference image, only the image residue information between the reference image and each of the other images needs to be stored, thereby reducing the storage space of the terminal that is occupied by the images and reducing the storage requirement on the terminal.

In the embodiment of the present invention, the terminal parses each of N obtained images, obtains N characteristics in each image and divides them into M characteristic sets. The terminal determines at least one image corresponding to each of the M characteristic sets as a first image set and obtains K first image sets. The terminal applies image compression to each of the K first image sets to generate K second image sets. In this way, the images can be compressed by category and the compression processing can be performed based on one criterion, thereby reducing the data volume of the compressed images and reducing the storage space occupied by the images.

The present invention have been described with reference to the flowcharts and/or block diagrams of the method, device (system) and computer program product according to the embodiments of the present invention. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the preferred embodiments of the present invention have been described above, further modifications and alternatives can be made to these embodiments by those skilled in the art based on the teaching of the present invention. Therefore, the preferred embodiments as well as all these modifications and alternatives are to be encompassed by the scope of present invention defined by the claims as attached.

Obviously, various modifications and variants can be made to the present invention by those skilled in the art without departing from the spirit and scope of the present invention. Therefore, these modifications and variants are to be encompassed by the present invention if they fall within the scope of the present invention as defined by the claims and their equivalents.

What is claimed is:

1. An image processing method, comprising:
   obtaining all image characteristics contained in each of N captured images and determining at least one image characteristic from the all image characteristics;
   searching the N images for at least three images each containing the at least one image characteristic based on the at least one image characteristic;
   determining a reference image from the at least three images and obtaining image residue information characterizing an image difference parameter between the reference image and each of the remaining at least two images; and
   applying data compression to the reference image and the image residue information to obtain a data compressed image data package having a data volume smaller than a data volume that would be obtained if the at least three images were compressed directly;
   wherein said determining the reference image from the at least three images comprises:
      determining image residue information between each of the at least three images and the other image of the at least three images; and
      determining from data volume corresponding to the image residue information an image corresponding to the image residue information having the smallest data volume as the reference image.

2. The method of claim 1, wherein the at least one image characteristic comprises time information and/or geographical location information for obtaining the image.

3. The method of claim 1, further comprising, subsequent to said applying data compression to the reference image and the image residue information to obtain a data compressed image data package:
   judging, upon detecting a deletion operation for deleting a first image of the at least three images, whether the first image is the reference image; and
   applying, when the first image is the reference image, predetermined image processing to image(s) of the at least three images other than the reference image to obtain an image set of predetermined image processed image(s).

4. The method of claim 3, wherein said applying predetermined image processing to the image(s) of the at least three images other than the reference image to obtain an image set of predetermined image processed image(s) comprises:
   restoring all of the at least three images based on the reference image and the image residue information when the first image is the reference image;
   determining a second image from all of the at least three images as a new reference image; and
   obtaining image residue information between each of the other image(s) of the at least three images and the new reference image based on the new reference image and compressing and storing the image set containing the new reference image and the image residue information.

5. The method of claim 3, wherein said applying predetermined image processing to the image(s) of the at least three images other than the reference image to obtain an image set of predetermined image processed image(s) comprises:
   obtaining image residue information between the reference image and a second image of the at least three images when the first image is the reference image;
   determining an image generated based on the second image and the image residue information as a new reference image; and
   obtaining image residue information between each of the other image(s) of the at least three images and the new reference image based on the new reference image and compressing and storing the image set containing the new reference image and the image residue information.

6. The method of claim 1, further comprising, subsequent to said applying data compression to the reference image and the image residue information to obtain a data compressed image data package:
   judging, upon detecting a deletion operation for deleting a first image of the at least three images, whether the first image is the reference image; and
   moving, when the first image is the reference image, the reference image from a current first storage position to a second storage position where the reference image can be used for restoring each of the at least three images.

7. The method of claim 6, further comprising, subsequent to said moving the reference image from the current first storage position to the second storage position:
   detecting whether the reference image has corresponding image residue information; and
   deleting the reference image from the second storage position when the reference image has no corresponding image residue information.

8. The method of claim 1, further comprising, after the data compressed image data package is obtained:
   decompressing, upon receiving one of the at least three images that is to be displayed, the reference image and the image residue information corresponding to the one image from the compressed data package; and
   adding the image residue information to the reference image and generating and displaying the image.

9. An electronic device, comprising:
   a processor;
   an obtaining module executable by the processor to obtain all image characteristics contained in each of N captured images and determine at least one image characteristic from the all image characteristics;
   a searching module executable by the processor to search the N images for at least three images each containing the at least one image characteristic based on the at least one image characteristic;
   a determining module executable by the processor to determine a reference image from the at least three images and obtain image residue information characterizing an image difference parameter between the reference image and each of the remaining at least two images; and
   a processing module executable by the processor to apply data compression to the reference image and the image residue information to obtain a data compressed image data package having a data volume smaller than a data volume that would be obtained if the at least three images were compressed directly;
   wherein the determining module is further executable by the processor to determine image residue information between each of the at least three images and the other image(s) of the at least three images and determine from data volume corresponding to the image residue information an image corresponding to the image residue information having the smallest data volume as the reference image.

10. The electronic device of claim 9, wherein
the determining module is further executable by the processor to judge, upon detecting a deletion operation for deleting a first image of the at least three images, whether the first image is the reference image, and
the processing module is further executable by the processor to apply, when the first image is the reference image, predetermined image processing to image(s) of the at least three images other than the reference image to obtain an image set of predetermined image processed image(s).

11. An image processing method, comprising:
obtaining all image characteristics contained in each of N captured images and determining at least one image characteristic from the all image characteristics;
searching the N images for at least three images each containing the at least one image characteristic based on the at least one image characteristic;
determining a reference image from the at least three images and obtaining image residue information characterizing an image difference parameter between the reference image and each of the remaining at least two images;
applying data compression to the reference image and the image residue information to obtain a data compressed image data package having a data volume smaller than a data volume that would be obtained if the at least three images were compressed directly; and
subsequent to applying the data compression to the reference image and the image residue information to obtain the data compressed image data package:
judging, upon detecting a deletion operation for deleting a first image of the at least three images, whether the first image is the reference image; and
applying, when the first image is the reference image, predetermined image processing to image(s) of the at least three images other than the reference image to obtain an image set of predetermined image processed image(s).

12. The method of claim 11, wherein the image characteristic comprises generation time information and/or geographical location information for the image.

13. The method of claim 11, wherein said applying predetermined image processing to the image(s) of the at least three images other than the reference image to obtain an image set of predetermined image processed image(s) comprises:
restoring all of the at least three images based on the reference image and the image residue information when the first image is the reference image;
determining a second image from all of the at least three images as a new reference image; and
obtaining image residue information between each of the other image(s) of the at least three images and the new reference image based on the new reference image and compressing and storing the image set containing the new reference image and the image residue information.

14. The method of claim 11, wherein said applying predetermined image processing to the image(s) of the at least three images other than the reference image to obtain an image set of predetermined image processed image(s) comprises:
obtaining image residue information between the reference image and a second image of the at least three images when the first image is the reference image;
determining an image generated based on the second image and the image residue information as a new reference image; and
obtaining image residue information between each of the other image(s) of the at least three images and the new reference image based on the new reference image and compressing and storing the image set containing the new reference image and the image residue information.

15. The method of claim 11, further comprising, after the data compressed image data package is obtained:
decompressing, upon receiving one of the at least three images that is to be displayed, the reference image and the image residue information corresponding to the one image from the compressed data package; and
adding the image residue information to the reference image and generating and displaying the image.

16. An image processing method, comprising:
obtaining all image characteristics contained in each of N captured images and determining at least one image characteristic from the all image characteristics;
searching the N images for at least three images each containing the at least one image characteristic based on the at least one image characteristic;
determining a reference image from the at least three images and obtaining image residue information characterizing an image difference parameter between the reference image and each of the remaining at least two images; and
applying data compression to the reference image and the image residue information to obtain a data compressed image data package having a data volume smaller than a data volume that would be obtained if the at least three images were compressed directly; and
subsequent to said applying the data compression to the reference image and the image residue information to obtain the data compressed image data package:
judging, upon detecting a deletion operation for deleting a first image of the at least three images, whether the first image is the reference image; and
moving, when the first image is the reference image, the reference image from a current first storage position to a second storage position where the reference image can be used for restoring each of the at least three images.

17. The method of claim 16, wherein the image characteristic comprises generation time information and/or geographical location information for the image.

18. The method of claim 16, further comprising, subsequent to said moving the reference image from the current first storage position to the second storage position:
detecting whether the reference image has corresponding image residue information; and
deleting the reference image from the second storage position when the reference image has no corresponding image residue information.

19. The method of claim 16, further comprising, after the data compressed image data package is obtained:
decompressing, upon receiving one of the at least three images that is to be displayed, the reference image and the image residue information corresponding to the one image from the compressed data package; and
adding the image residue information to the reference image and generating and displaying the image.

20. An electronic device, comprising:
a processor;
an obtaining module executable by the processor to obtain all image characteristics contained in each of N captured images and determine at least one image characteristic from the all image characteristics;

a searching module executable by the processor to search the N images for at least three images each containing the at least one image characteristic based on the at least one image characteristic;

a determining module executable by the processor to determine a reference image from the at least three images and obtain image residue information characterizing an image difference parameter between the reference image and each of the remaining at least two images; and a processing module executable by the processor to apply data compression to the reference image and the image residue information to obtain a data compressed image data package having a data volume smaller than a data volume that would be obtained if the at least three images were compressed directly;

wherein the determining module is further executable by the processor to judge, upon detecting a deletion operation for deleting a first image of the at least three images, whether the first image is the reference image; and wherein the processing module is further executable by the processor to apply, when the first image is the reference image, predetermined image processing to image(s) of the at least three images other than the reference image to obtain an image set of predetermined image processed image(s).

\* \* \* \* \*